US007184178B2

(12) United States Patent
Panunto et al.

(10) Patent No.: US 7,184,178 B2

(45) Date of Patent: Feb. 27, 2007

(54) PRODUCT AND DOCUMENT FULFILLMENT SYSTEM

(75) Inventors: John P. Panunto, Oakville (CA); Wing Fal Lam, Mississauga (CA)

(73) Assignee: PSI Peripheral Solutions Inc., Mississauga (CA)

( * ) Notice: Subject to any disclaimer, the term of this patent is extended or adjusted under 35 U.S.C. 154(b) by 1054 days.

(21) Appl. No.: 10/259,619

(22) Filed: Sep. 30, 2002

(65) Prior Publication Data

US 2003/0081223 A1 May 1, 2003

Related U.S. Application Data

(63) Continuation-in-part of application No. 09/688,125, filed on Oct. 16, 2000, now Pat. No. 6,791,706.

(51) Int. Cl.

*G06K 15/02* (2006.01)
*G06K 7/00* (2006.01)
*G06K 13/00* (2006.01)
*G06K 19/00* (2006.01)
*G06F 7/00* (2006.01)
*B65G 49/00* (2006.01)

(52) U.S. Cl. .................. 358/3.28; 358/1.12; 358/1.18; 700/215; 700/219; 700/221; 700/222; 700/225; 700/230; 235/435; 235/440; 235/475; 235/487

(58) Field of Classification Search ............... 358/3.28, 358/1.12, 1.18; 382/100, 141, 143; 700/214–216, 700/219–222, 224–230; 235/435, 440, 454, 235/487, 462.01, 475, 476

See application file for complete search history.

(56) References Cited

U.S. PATENT DOCUMENTS

| | | | | |
|---|---|---|---|---|
| 4,519,522 | A * | 5/1985 | McElwee | 700/215 |
| 5,230,206 | A * | 7/1993 | Christ | 53/501 |
| 6,529,798 | B1 * | 3/2003 | Christ | 700/223 |
| 2003/0080191 | A1 * | 5/2003 | Lubow et al. | 235/462.01 |
| 2006/0118631 | A1 * | 6/2006 | Lubow et al. | 235/462.01 |
| 2006/0175401 | A1 * | 8/2006 | Roberts | 235/462.13 |

FOREIGN PATENT DOCUMENTS

| | | | |
|---|---|---|---|
| DE | 40 11 823 | A1 | 10/1991 |
| DE | 19622482 | A1 * | 12/1997 |
| DE | 197 44 058 | A1 | 4/1999 |
| GB | 2 284 412 | A | 6/1995 |

* cited by examiner

*Primary Examiner*—Scott A. Rogers
(74) *Attorney, Agent, or Firm*—Marks & Clerk; Richard J. Mitchell; Hetal Kushwaha

(57) ABSTRACT

A product and document fulfilment system for merging together discrete articles and specific documentation which pertains to each discrete article, and for packaging and labelling the same. The system comprises an article conveyor on which discrete articles are carried seriatim, a first machine code reader for reading the unique machine readable code on each discrete article, a printer for printing a specific document pertaining to the article, instruction control means governing the delivery of the appropriate document to be merged with the article, a merging station where the specific document and the article are merged, a second machine code reader for reading the machine readable code on the specific document, first memory and counter means for recognizing the identity of the discrete article at the merging station, and accept/reject means to accept the merged article and specific document when a match occurs, or reject the item when no match occurs.

16 Claims, 2 Drawing Sheets

PRODUCT AND DOCUMENT FULFILLMENT SYSTEM

CROSS-REFERENCE TO RELATED APPLICATION

This application is a Continuation-in-Part application of application Ser. No. 09/688,125 filed Oct. 16, 2000 now U.S. Pat. No. 6,791,706.

FIELD OF THE INVENTION

This invention relates to product and document fulfilment systems, whereby discrete articles and specific documentation which pertains to each discrete article are merged together for packaging and labelling. The invention also relates to such systems where non-discrete articles may also be packaged with each discrete article, where the non-discrete articles which are packaged with one specific article may or may not be the same as those which are packaged with any other specific article.

BACKGROUND OF THE INVENTION

The parent application, noted above, teaches a machine and process for making and applying documents to objects, and particularly an order fulfilment, distribution, and inventory control system whereby related documents or control items such as packing slips are made and applied to specific goods. That invention is particularly related to a machine, however, where a pouch or pocket for documents which relate to a specific article is manufactured, and the document is delivered to the packaged article for further handling.

To that end, the parent application discusses the features of such an application of printing and folding documents, the background of that invention, and the details thereof, some of which are either directly related to or supplemental to an understanding of the present invention.

Distribution warehouses, organizations, or carriers who fulfil orders for goods or items to be delivered to customers, generally rely on significant and manually intensive processes, or at best partially automated processes, to create and affix a packing slip for shipment of goods. The document, or a set of documents, must first be created; and those documents will describe the content, warranty, control marks, operation, drawings, destination or address, or other pertinent information or inventory control object or transponder related to the shipment or item. The documents are typically printed on letter size paper, but may be folded up to a size of one sixth of the original size, so as to display the intended destination address but to maintain other information relating to the contents, the costs thereof, and so on, hidden from view until such time as the packaging slip is removed from a pouch. In prior systems, such documents were manually inserted into a translucent adhesive pouch which was affixed to the outside of a package, which could have been a box, bag, or envelope.

The parent invention seeks to overcome the manually intensive process either partially or completely, by using a combination of paper handling devices and providing a specific sequence and control for the provision of documents and the pouch into which they will be placed.

Thus, the parent application teaches an invention which employs single or double rolls of tape, to create a functional container for documents and/or inventory control transponders which may be full sized or folded. By using specific materials, selected adhesive portions, transparency, and markings, a pouch is created by the single or double rolls of tape which may then be used to suit various needs and automation requirements for fulfilment and/or inventory control.

Accordingly, the parent application teaches a machine which accepts documents of various orientations and sizes from common printers, so as to lower fulfilment automation costs. The parent application also teaches a machine which assembles one or more related documents or control items into a set, which may be folded to a smaller size. The intent is to increase usage and to reduce fulfilment costs.

In keeping with the teaching of the parent application, a machine is provided which encloses a set of related documents in an opaque or translucent, adhesive or self-adhesive pouch, envelope, or attachment for a package. The machine is such that the related documents may be moved from a printer, accumulated, folded, enclosed, and applied to a package.

The machine and process in keeping with the parent application teachings comprise an adjustable high speed document receiving station at which various sized documents from common printers will be received. Then, an adjustable accumulator station uses various optical marks and/or software to control the number of documents which are accumulated to form a set, and the movement of that set of documents to further stations. Various industry standard folds may be applied to the document set, which may then be optionally folded further to create a smaller size document set. The orientation of the document set may be controlled.

Then, single or multiple rolls of adhesive or non-adhesive materials are fed to a station to create a container, pouch, or other document attachment device, into which the document set may then be inserted and placed onto a package such as a box, envelope, or bag. Specific teachings of the machine and its process are provided in the parent application, and to the extent that those teachings are relevant to the present invention, they are repeated hereafter.

It should be noted, however, that the entire machine and process are controlled by software, programmable logic controllers, and various sensors which have an additional ability to control or to be controlled by external programmable logic controllers or computers. Similar computer or instruction control means are provided for in the present invention; however, it will be evident that specifics of the computer control are well known to those skilled in that art, and moreover such specifics will apply on a case-by-case basis with respect to the specific product and document fulfilment system which is in keeping with the present teachings, and the manner in which it is employed.

Thus, as will be described in greater detail hereafter, the present invention allows the use of machines and conveyor equipment which are otherwise known, together with software control, sensing components, and the like, so as to provide a fulfilment system which applies labels and the like to discrete articles being shipped. Moreover, the present invention optionally permits the placement of non-discrete articles in the same shipping package, where differing non-discrete articles may be included in different packages in keeping with specific instructions relating to preferences of the recipient of the package to be shipped, either as they have been indicated by that recipient to the packager, or as they are known by the packager from its own database of customer preferences.

SUMMARY OF THE INVENTION

Thus, the present invention provides a product and document fulfilment system for merging together discrete articles and specific documentation which pertains to each discrete article, and for packaging and labelling the same.

Included in the product and document fulfilment system of the present invention is an article conveyor on which discrete articles are carried seriatim. Each discrete article carries on it a unique machine readable code which has instruction information pertaining thereto.

There is a first machine code reader for reading each unique machine readable code.

A printer is provided for printing a specific document which pertains to each discrete article, in keeping with the instruction information contained in the unique machine readable code associated with each discrete article.

Instruction control means are provided to instruct a document delivery means to deliver the specific document which pertains to a specific discrete article from the printer to a merging station, so as to be merged with the respective discrete article.

There is, therefore, a merging station which has a second machine code reader adjacent thereto. The second machine code reader is at a position where the specific discrete article and its respective specific document are merged together, so that the second machine code reader can read information on the respective specific document.

First memory and counter means are associated with the article conveyor and the first machine code reader whereby, at any instant in time, the identity of a specific discrete article at the merging station is known.

Accept/reject means are provided to accept the merged article and the specific document associated therewith, when the information read from the specific document matches information from the first memory and counter means. The merged article and specific documents are thereby permitted to proceed for further handling. However, when there is no match between the information read from the specific document and the information from the first memory and counter means, the accept/reject memory means acts to reject the merged article and specific document.

Typically, the first memory and counter means operates to store information as to the unique machine readable code for each specific discrete article as it is carried seriatim past the first machine code reader, in its memory, and so as to recover the information in that unique machine readable code from memory for that specific discrete article when the counter has determined that the specific discrete article has reached the merging station.

The counter may determine that any specific discrete article has reached the merging station as a result of one of several different circumstances, including: a given number of sequential steps of the article conveyor have occurred since the article passed the first machine code reader, or a predetermined period of time has expired since the article passed the first machine code reader.

A third machine code reader may be adjacent to the merging station, so that the unique machine readable code of a specific discrete article is read as the article reaches the merging station. Thus, the information which is contained in the unique machine readable code for that specific discrete article is fed to the first memory and counter means.

The apparatus of the present invention may further comprise a storage and supplemental conveyor for delivering at least one non-discrete article to the merging station, in keeping with instruction information which is contained in each unique machine readable code for each discrete article, as it is read at the first machine code reader.

Further, apparatus in keeping with the present invention will typically comprise a label printer and a packager for packaging each merged discrete article and its respective specific document, and for placing a label on the package where the label carries specific discrete information in keeping with instructions derived from the instruction information contained in the respective unique machine readable code as it was read from the discrete article.

Where non-discrete articles are also merged with the discrete article and its respective specific document, that at least one non-discrete article is also delivered to the label printer and packager for handling, accordingly.

There may be a fourth machine code reader which is located after the label printer and packager, for reading the label and comparing the information read therefrom with the information which is retained in the first memory and counter means.

Typically, each discrete article may be one of the following: it could be an article of clothing, a book, packaged pharmaceuticals, packaged software, packaged computer parts or accessories, cosmetics, small household appliances, small household electronic devices, and sporting goods.

Typically, the specific document which is fitted with each discrete article, as it is merged therewith at the merging station, is an invoice or packaging slip, and it could also include specific warranty information, shipping and tracking data, etc.

Moreover, typically the non-discrete articles are such as catalogues, brochures, CDs, promotional gifts, and combinations thereof.

In general, the unique machine readable code on any respective discrete article is a barcode, but it might be a magnetic character, a coded magnetic strip, OCR readable characters, or combinations thereof.

Thus, the machine code reader may typically be a barcode reader, a magnetic character reader, a magnetic strip reader, an optical character reader, or a combination thereof.

The instruction information which is included in the unique machine readable code typically consists of a customer number, and the identity of the respective discrete article, and combinations thereof.

Also, additional data which are related to each customer number are stored in the instruction control means—typically, a computer. Such additional data may include such as the customer name and address, customer preferences, additional billing information, customer credit information, and the like, and combinations thereof.

In general, the package into which the discrete article and its respective document and optionally the at least one non-discrete article are placed, may be a preformed envelope, an envelope which is formed in the packager, a bag, a box, or other suitable container.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

Figure 1:
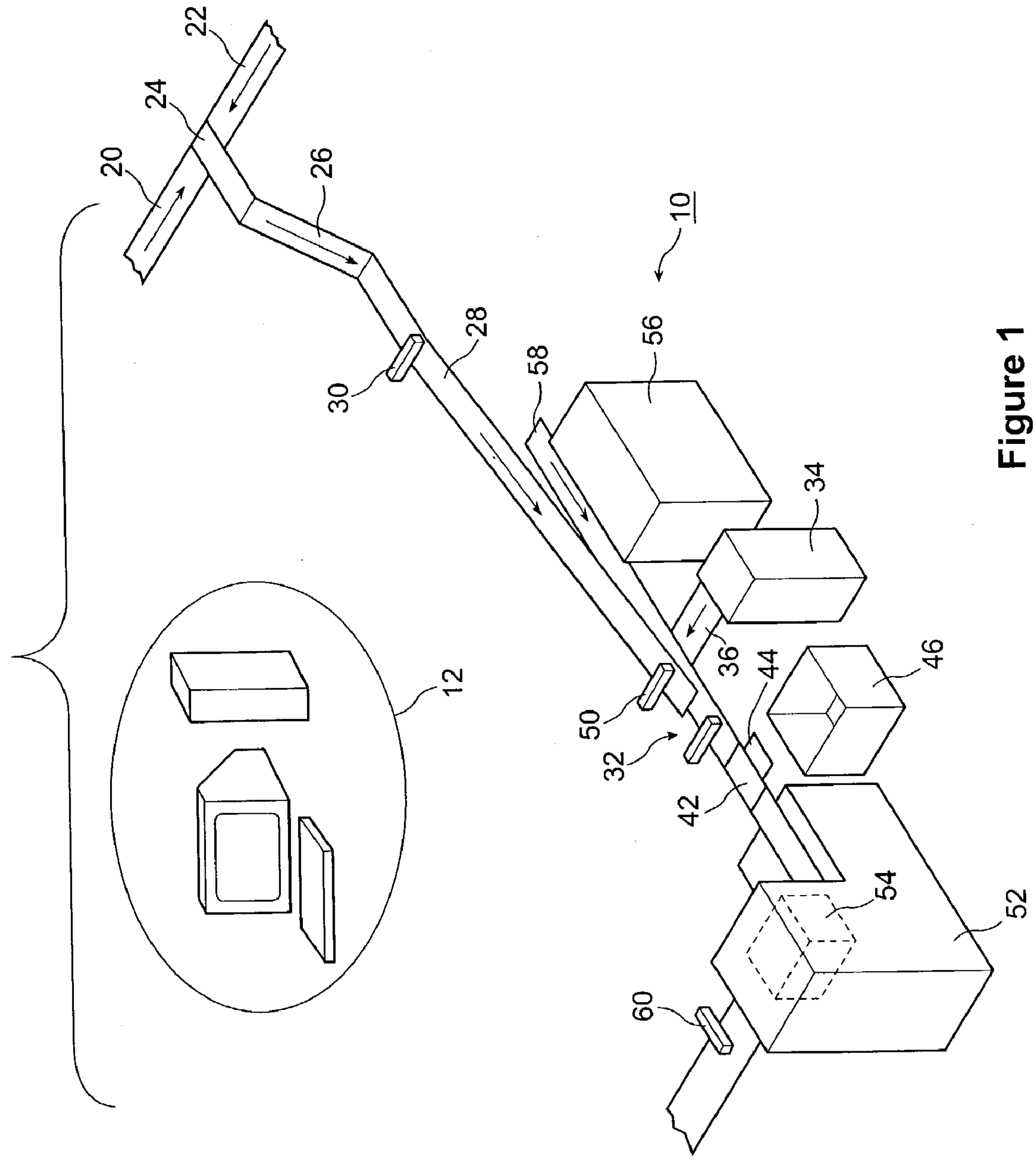
FIG. 1 provides a functional view of apparatus in keeping with the present invention.

Turning first to FIG. 1, a typical functional view of a product and document fulfilment system in keeping with the present invention is shown, in a general configuration such as will be found in the shipping room of a catalogue merchandiser, for example. No specific apparatus elements are intended to be specifically illustrated, it being understood that most of the elements of the apparatus of FIG. 1 are ones which are individually well known to skilled persons in the respective industries. However, it is the combination of those elements, their operation, and their control, which is the subject of the present invention.

First, it must be understood that the purpose of a product and document fulfilment system is to ensure that specific products are merged with specific documents relating thereto, for shipment to a customer. Thus, it is important that the order which has been made by any specific customer be fulfilled, and that fulfilment of that order shall encompass production of a package which is such that the specific discrete article which has been ordered by that customer, together with the documentation pertaining to, and governing the delivery of, that specific discrete article, has been merged with the article for further handling.

In its broadest concept, the present invention provides a product and document fulfilment system which may lead up to the machinery of the parent application, at which point a document is prepared and folded, placed in a document pouch, and attached to the package.

A typical example of discrete articles to be packaged and labelled, in keeping with the present invention, together with their specific documentation, may be such as articles of clothing, camping articles, sporting goods, and the like, all of which may be included in the catalogue of, or at the website of, a catalogue and/or e-commerce retailer. Considering only the question of articles of clothing, and specifically such articles as shirts, it will be understood that any customer might order a specific and discrete article of clothing which would have a particular colour and a particular size. It would not do for that retailer to ship the wrong colour and/or the wrong size to the customer, because business could be lost and in any event additional cost would be encountered in recovering and collecting the mistake.

Neither would it be appropriate for information which is relevant to one article of goods being sold to be placed into the package with other goods being sold. For example, if the goods are pharmaceuticals, the wrong instructions might be packaged with the pharmaceuticals unless appropriate care is taken, and moreover it is possible to deduce that a particular customer has a specific physical or mental ailment if information concerning the pharmaceuticals for treatment of that ailment are mailed to the wrong person.

Thus, for any retail operation, or shipment consolidator who packages and ships differing products for different clients to specific customers of those clients, a foolproof product and document fulfilment system which will not make mistakes, is of paramount importance.

However, it will be understood that it is also of great importance to any such retailer or consolidator that such product and fulfilment system shall be provided at a reasonable cost so as to permit the delivery of the products to the ultimate customers thereof, at a reasonable price.

Accordingly, a warehouse is provided, not shown, which includes a shipping and packaging room in which the product and document fulfilment system 10, in keeping with the present invention, is installed.

It will be understood, of course, that the operation of the product and document fulfilment system is typically controlled by an instruction control centre which is shown schematically at 12. The instruction and control centre may be a single computer, it may be a plurality of interconnected computers, and it may also include or comprise distributed intelligence among the apparatus controllers for various elements of the product and document fulfilment system in keeping with the present invention.

From a storage area, the discrete articles to be handled by the product and document fulfilment system in keeping with the present invention are typically placed on an infeed conveyor 20, 22, which delivers discrete articles to a convergence conveyor element 24. The articles are then delivered to an alignment conveyor 26. The order in which the discrete articles are delivered to the alignment conveyor 26 is not predetermined. They are simply delivered one after another as they have been placed onto the infeed conveyor 20, 22 by warehouse workers. However, it will be understood that each of the discrete articles as it is delivered to the infeed conveyor 20,22 has been handled by the warehouse workers who take those items from inventory, and that at that time a label has been placed on the article identifying it as being an article which is in fulfilment of a specific order that has been placed by a specific customer. In other words, the destiny of each discrete article as it is delivered to the alignment conveyor 26 is known as a consequence of a label of some sort or other which has been placed on the article by such as a warehouse worker. The label which has been placed on the specific article is one which has been probably generated by an order desk, instructing that a specific and discrete article shall be taken from inventory for delivery to a specific customer.

Thus, the label which is placed on each discrete article will contain at least information such as a customer number or other control number. The label may also contain other information including the identity of the respective discrete article, as well as information relating to the customer and the preferences of the customer, as discussed hereafter.

The alignment conveyor 26 feeds each discrete article seriatim to an article conveyor 28, along which it will pass until it reaches a merging station 32, described hereafter. First, each discrete article will, in turn, pass a first machine code reader 30, which will read the unique machine readable code which has been placed on the article, and which thereby contains instruction information pertaining to that article.

As is understood from the discussion above, each machine readable code on each discrete article is unique to that article.

A printing station 34 is provided, and it includes a printer which is typically such as a laser printer or the like, and that printer will print a specific document which pertains to each discrete article. The specific document is therefore in keeping with instruction information which is contained in the unique machine readable code associated with each discrete article. It will be understood that the printer prints the specific document which will pertain to a specific discrete article, after that specific discrete article has passed the first machine code reader 30.

As the discrete article continues along the article conveyor 28, the instruction control centre 12 instructs a document delivery means 36 to deliver the specific document which pertains to a specific discrete article from the printer 34 to the merging station 32, to be merged with the respective discrete article.

The manner in which the article and the specific document which pertains thereto are merged at the merging station 32 is beyond the scope of the present invention, and will depend at least in part on the nature of the article. Nonetheless, a discrete product or article/document set will be produced at the merging station 32, for further handling.

A second machine code reader 40 is provided at the merging station 32, adjacent but downstream therefrom, so as to be placed at a position where the specific discrete article and its respective specific document have been merged together. The second machine code reader 40 will read the information from the respective specific document.

First memory and counter means are associated with the article conveyor 28, and will be found in the instruction and control centre 12. The purpose of the first memory and counter means is to specifically know, at any instance in time, the identity of the specific discrete article which has arrived at the merging station 32.

Accordingly, after an article/document set has left the merging station 32 and the document has been read by the second machine code reader 40, the first memory and counter means will match the information which has been read from the specific document with the information from the first memory and counter means which is relevant to the specific discrete article that has just gone past the merging station 32. If a match occurs, then accept/reject means 42 will accept the merged article and specific document, and will pass the article/document set on for further handling in a manner described hereafter. Otherwise, if there is no match—in other words, there is a mismatch between the information relevant to the specific discrete article at the merging station 32, as it is known to the first memory and counter means—then the accept/reject means 42 will reject the article/document set and sent it via a chute or conveyor 44 to a bin 46.

Typically, the first memory and counter means in the instruction control centre 12 operates to store information as to the unique machine readable code for each specific discrete article as it is carried seriatim past the first machine code reader 30, in its memory. It then functions to recover the information in that unique machine readable code from memory for that specific discrete article, when the counter has determined that the specific discrete article has reached the merging station 32.

How the counter determines that a specific discrete article has reached the merging station 32, comes as a consequence of one of several different circumstances. For example, typically the article conveyor 28 operates incrementally, under process control—typically from the instruction control centre 12—whereby each time an article/document set leaves the merging station 32, the article conveyor 28 moves forward a specific amount, and thus operates in stepped fashion. The number of steps between the position at which the first machine code reader 30 is placed, and the merging station 32, is known, and thus it is known how many steps are required for any specific discrete article to reach the merging station 32 after it has passed the first machine code reader 30. Otherwise, if the article conveyor 28 operates at a known rate, continuously, then a predetermined period of time will determine when a specific discrete article whose presence has been noted at the first machine code reader 30 has reached the merging station 32.

However, there may also be a third machine code reader 50 which is adjacent to the merging station 32, but upstream from the merging station 32. Thus, the unique machine readable code of a specific discrete article may be read by the machine code reader 50 as the article reaches the merging station 32. The information contained in the unique machine readable code for that specific discrete article is fed to the first memory and counter means in the instruction control centre 12, and may be utilized as a double check against the counter or instead of the counter, so as to assure the accept/reject means 42 of the identity of the specific discrete article at the merging station 32 at the same time as the document is being read by the machine code reader 40.

In general, the product and document fulfilment system and apparatus in keeping with the present invention further comprises a label printer and a packager machine or station indicated generally at 52. The purpose of the label printer and packager 52 is to package each merged discrete article/document set, and to place a label on the package into which the merged discrete article/documents set has been placed, in a manner outside the scope of the present invention. The label is typically printed on a printer 54, and is placed on the package so as to carry discrete information which is in keeping with instructions that are derived from the instruction information contained in the respective unique machine readable code associated with the discrete article.

Thus, for example, the unique machine readable code on the article as it reaches the label printer and packager station 52 may include a customer number, and therefore the necessary address and other information relating to that customer may be derived from a customer database maintained within the instruction control centre 12. Very often, the specific discrete instruction information which is carried in the unique machine readable code on any discrete article may also contain additional information relating to the preferences of the customer, or the intentions of the shipper of the article, to include additional non-discrete items with the discrete article. Such non-discrete items particularly include catalogues and brochures which may have been requested by the specific customer, or which may be intended to be placed with the article being shipped by the shipper in keeping with known preferences of the customer.

Thus, the product and document fulfilment system of the present invention may further comprise a storage and feeding station 56 from which one or more non-discrete articles may be feed to a supplemental conveyor 58 for delivery also to the merging station 32, together with a specific article/document set.

For example, a determination may be made either as a consequence of a specific request from the customer, or at the instigation of the shipper, to provide the catalogues or brochures, a CD, or a promotional gift, or any of them, together with the discrete article which is being delivered to the customer on the order of that customer.

It will be understood, of course, that the specific non-discrete article or articles that are to be merged with the merged article/document set at the merging station 32 are, therefore, in keeping with further instructions which are included in the instruction information contained in the unique machine readable code on each specific discrete article.

Returning to the label printer and packager 52, and the label printer 54 which is found within the label printer and packager station 52, it will be understood that the label printer 54 will print a label in keeping with specific discrete information that is found from the respective unique machine readable code on the specific discrete article being packaged. Once again, that specific information may be recalled from a database, whereby a customer number provides all of the necessary information for the shipping label to be printed.

However, for purposes of greater certainty, a fourth machine code reader 60 may be located after the label printer and packager station 52, for reading the label and comparing the information which is read therefrom with the information which is retained in the first memory and counter means contained in the instruction control centre 12. This assures that the correct information is printed on the label, since the identity of the customer for the specific discrete article will have been determined from the unique machine readable code on that article, and since it is known which article it is.

It will also be understood, of course, that the label printer and packager 52 could be the folding and labelling machine which is described in the parent application together with additional and appropriate ancillary equipment. In any event, the specifics of that label printer and packager station 52 are beyond the scope of the present invention.

While not limited thereto, it can be noted that typical discrete articles which may be handled by the product and document fulfilment system in keeping with the present invention may include such items as articles of clothing, books, pharmaceuticals, packaged software, packaged computer parts or accessories, cosmetics, small household appliances, small household electronic devices, and sporting goods. Typically, the specific document which is associated with discrete article is an invoice or packaging slip, but it may also include warranty information, tracking information, and the like.

Each unique machine readable code which is placed on a respective discrete article is typically a barcode, but it might be a magnetic character, coded magnetic strip, or OCR readable characters. Thus, the machine code readers 30, 40, 50, 60 are typically barcode readers, but might be magnetic characters readers, magnetic strip readers, optical character readers and combinations thereof.

It will be understood that a database relating to each customer, and possibly also relating to differing kinds of non-discrete articles that might be shipped depending on the nature of the discrete article to be shipped, will be maintained in the instruction control centre. Thus, while the instruction information which is included in the unique machine readable code for each specific discrete article may include only a customer number, and might also include the identity of the respective discrete article, other additional data may also be found either in that instructional data or more particularly in a database found within the instruction control centre. Such additional data may include the customer name and customer address, the customer preferences, additional billing information, customer credit information, and combinations thereof.

Of course, the nature of the package into which the discrete article and its respective document, may be placed, and optionally the non-discrete article or articles, is outside the scope of the present invention, but will be understood to include such as preformed envelopes, envelopes that are formed in the packager, shipping bags of various sorts, and boxes and other suitable containers.

Figure 2:
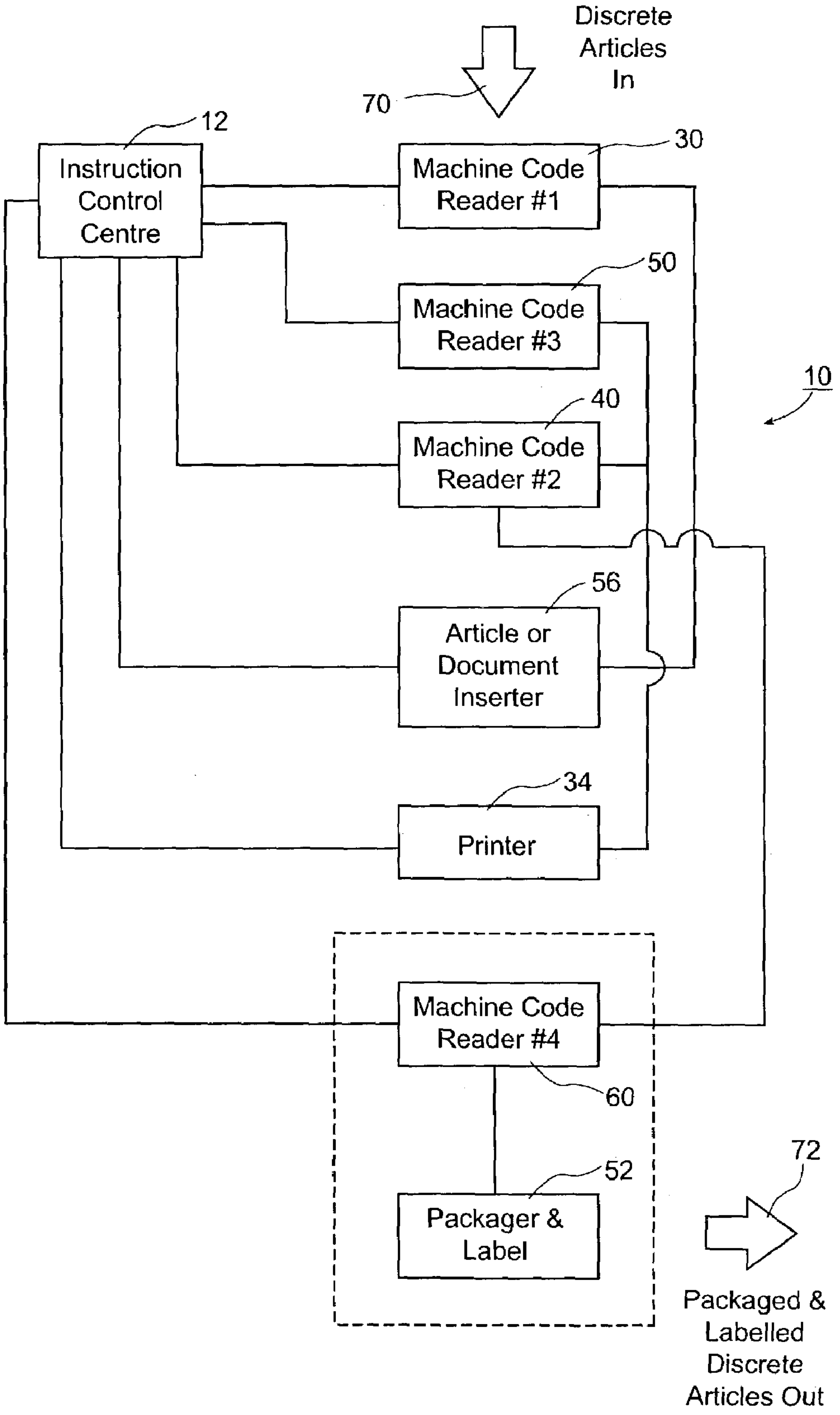
FIG. 2 provides a system view in schematic form, for the product and fulfilment system in keeping with the present invention.

Turning briefly to FIG. 2, a system view of the present invention is provided. Particularly, it will be seen that discrete articles come into the product and document fulfilment system, which is in keeping with the present invention, as shown at arrow 70; and packaged and labelled discrete articles leave the product and document fulfilment system as shown at arrow 72. Various interrelations of the differing elements which comprise the product and document fulfilment system 10 are indicated by the lines interconnecting the various elements, and which will be understood by those skilled in the art to represent paths along which data and instructions will flow.

There has been described a product and document fulfilment system which satisfies the requirements of a number of industries and retail establishments which specific discrete articles together with specific documentation pertaining to that specific discrete article are to be merged and prepared for packaging and delivery to the respective customers or recipients thereof.

Other modifications and alterations may be used in the design and manufacture of the apparatus of the present invention without departing from the spirit and scope of the accompanying claims.

Throughout this specification and the claims which follow, unless the context requires otherwise, the word “comprise”, and variations such as “comprises” or “comprising”, will be understood to imply the inclusion of a stated integer or step or group of integers or steps but not to the exclusion of any other integer or step or group of integers or steps.

The invention claimed is:

1. A product and document fulfilment system for merging together discrete articles and specific documentation which pertains to each discrete article, and for packaging and labelling the same, comprising:

an article conveyor on which discrete articles are carried seriatim, and where each discrete article carries on it a unique machine readable code having instruction information pertaining thereto;

a first machine code reader for reading each unique machine readable code;

a printer for printing a specific document which pertains to each discrete article, in keeping with the instruction information contained in said unique machine readable code associated with each said discrete article;

instruction control means to instruct a document delivery means to deliver the specific document which pertains to a specific discrete article from said printer to a merging station, to be merged with the respective discrete article;

a merging station and a second machine code reader adjacent thereto, at a position where said specific discrete article and its respective specific document are merged together, wherein said second machine code reader reads information on the respective specific document;

first memory and counter means associated with said article conveyor and said first machine code reader whereby, at any instant in time, the identity of a specific discrete article at said merging station is known; and accept/reject means to accept the merged article and specific document when the information read from a specific document matches information from said first memory and counter means, so as to permit said merged article and specific document to proceed for further handling, and to reject said merged article and specific document when no match occurs.

2. The apparatus of claim 1, wherein said first memory and counter means operates to store information as to the unique machine readable code for each specific discrete article as it is carried seriatim past said first machine code reader in memory, and to recover the information in that unique machine readable code for that specific discrete article from memory when said counter has determined that the specific discrete article has reached said merging station.

3. The apparatus of claim 2, wherein said counter determines that a specific discrete article has reached said merging station as a result of one of the circumstances chosen from the group consisting of: a given number of sequential steps of said article conveyor have occurred since the article passed said first machine code reader, and a predetermined period of time has expired since the article passed said first machine code reader.

4. The apparatus of claim 1, further comprising a third machine code reader adjacent said merging station, whereby the unique machine readable code of a specific discrete article is read as the article reaches the merging station, and the information contained in the unique machine readable code for that specific discrete article is fed to said first memory and counter means.

5. The apparatus of claim 1, further comprising a storage and supplemental conveyor means for delivering at least one non-discrete article to said merging station in keeping with instruction information contained in each unique machine readable code for each discrete article, as it is read at said first machine code reader.

6. The apparatus of claim 1, further comprising a label printer and a packager for packaging each merged discrete article and its respective specific document, and for placing a label on the package where said label carries specific discrete information in keeping with instructions derived from said instruction information contained in the respective unique machine readable code.

7. The apparatus of claim 5, further comprising a label printer and a packager for packaging each merged discrete article, its respective specific document and said at least one non-discrete article, and for placing a label on the package where said label carries specific discrete information in keeping with instructions derived from said instruction information contained in the respective unique machine readable code.

8. The apparatus of claim 6, further comprising a fourth machine code reader located after said label printer and packager, for reading said label and comparing the information read therefrom with the information retained in said first memory and counter means.

9. The apparatus of claim 7, further comprising a fourth machine code reader located after said label printer and packager, for reading said label and comparing the information read therefrom with the information retained in said first memory and counter means.

10. The apparatus of claim 1, wherein each discrete article is chosen from the group consisting of articles of clothing, books, pharmaceuticals, packaged software, packaged computer parts or accessories, cosmetics, small household appliances, small household electronic devices, and sporting goods; and wherein each specific document is chosen from the group consisting of invoices and packaging slips.

11. The apparatus of claim 5, wherein each discrete article is chosen from the group consisting of articles of clothing, books, pharmaceuticals, packaged software, packaged computer parts or accessories, cosmetics, small household appliances, small household electronic devices, and sporting goods;

wherein each specific document is chosen from the group consisting of invoices and packaging slips; and wherein each non-discrete article is chosen from the group consisting of catalogues, brochures, CDs, promotional gifts, and combinations thereof.

12. The apparatus of claim 1, wherein each unique machine readable code on a respective discrete article is chosen from the group consisting of barcodes, magnetic characters, coded magnetic strips, OCR readable characters, and combinations thereof; and wherein each machine code reader is chosen from the group consisting of barcode readers, magnetic character readers, magnetic strip readers, optical character readers, and combinations thereof.

13. The apparatus of claim 1, wherein said instruction information includes data chosen from the group consisting of customer number, identity of the respective discrete article, and the combinations thereof.

14. The apparatus of claim 13, wherein additional data related to each customer number are stored in said instruction control means, and include data chosen for the group consisting of customer name, customer address, customer preferences, additional billing information, customer credit information, and combinations thereof.

15. The apparatus of claim 6, wherein the package into which the discrete article and its respective document are placed is chosen from the group consisting of preformed envelopes, envelopes formed in said packager, bags, and boxes.

16. The apparatus of claim 7, wherein the package into which the discrete article, its respective document, and said at least one non-discrete article are placed is chosen from the group consisting of preformed envelopes, envelopes formed in said packager, bags, and boxes.

* * * * *